(12) United States Patent
Reese

(10) Patent No.: US 6,564,767 B1
(45) Date of Patent: May 20, 2003

(54) METHOD FOR TUNING INTERNAL COMBUSTION ENGINE MANIFOLDS

(75) Inventor: Brian T. Reese, Manchester, NJ (US)

(73) Assignee: SLP Performance Parts, Inc., Toms River, NJ (US)

( * ) Notice: Subject to any disclaimer, the term of this patent is extended or adjusted under 35 U.S.C. 154(b) by 0 days.

(21) Appl. No.: 10/156,400

(22) Filed: May 28, 2002

(51) Int. Cl.[7] .............................. F02B 27/00
(52) U.S. Cl. ................. 123/184.53; 60/313; 60/323
(58) Field of Search .............. 123/184.53, 184.21; 60/312, 313, 323

(56) References Cited

U.S. PATENT DOCUMENTS

| | | | | |
|---|---|---|---|---|
| 4,461,248 A | * | 7/1984 | McFarland, Jr. ........ | 123/184.53 |
| 4,689,952 A | | 9/1987 | Arthur et al. .................. | 60/313 |
| 4,756,284 A | * | 7/1988 | Okimoto et al. ........ | 123/184.53 |
| 5,085,177 A | * | 2/1992 | Ma ......................... | 123/184.53 |
| 5,216,883 A | | 6/1993 | Flugger ....................... | 60/313 |
| 5,768,891 A | * | 6/1998 | Wagner ....................... | 60/313 |
| 5,915,365 A | | 6/1999 | Meisinger et al. ........... | 123/527 |
| 6,038,855 A | * | 3/2000 | Markstrom et al. .......... | 60/323 |
| 6,052,990 A | | 4/2000 | Gecker, Jr. .................. | 60/312 |
| 6,134,885 A | | 10/2000 | Gilbertson .................... | 60/312 |
| 6,202,409 B1 | | 3/2001 | Taylor ......................... | 60/312 |

* cited by examiner

Primary Examiner—Marguerite J. McMahon
(74) Attorney, Agent, or Firm—Moser, Patterson & Sheridan, LLP; Keith Taboada, Esq.

(57) ABSTRACT

A method for tuning input/exhaust primaries in a multi-chamber spark ignition internal combustion engine. This method improves engine performance by correlating the timing of wave pulses in the input or exhaust system to combustion events in the combustion chambers. This has the effect of increasing the volumetric efficiency of the engine, resulting in increased brake specific fuel consumption and increased specific volume output.

13 Claims, 5 Drawing Sheets

METHOD FOR TUNING INTERNAL COMBUSTION ENGINE MANIFOLDS

BACKGROUND OF THE DISCLOSURE

1. Field of Invention

Embodiments of the invention generally relate to a method for tuning manifolds for an internal combustion engine.

2. Background of Prior Art

A multi-chamber, internal combustion engine includes intake ports for delivering fuel and air to combustion chambers where the air/fuel mixture is ignited. Combustion by-products are channeled out of the combustion chamber through exhaust ports into a manifold. The manifold serves to merge the combustion by-products from the individual combustion chambers together to form a single stream of combustion by-products. The combustion chamber is typically defined by a piston and cylinder, or a rotor and peripheral housing.

For example, a typical inline four-cylinder engine has an intake and an exhaust port for each cylinder. Each exhaust port is coupled to a manifold by an individual inlet, called a primary. Within the manifold, the four primaries merge into a single outlet port called a collector, which channels the combustion by-products away from the engine for subsequent exhausting to the atmosphere.

In typical engine designs, the distance between the individual primary inlets and the collector merge point is not a functionally critical specification; i.e., individual primary lengths are not selected with an intent to improve flow, thermal characteristics, scavenging, or other aspects. Conventionally, the standard criteria for establishing individual primary lengths are based upon convenient fitment or geometric constraints.

Primaries designed using convenience or bulk/average criteria are generally connected from primary inlet to collector merge point by the simplest, most convenient route with no other consideration to the performance consequences of individual primary lengths.

Primaries designed using an equal length criteria are constrained in that the distance between each primary inlet and collector merge point is precisely the same (equal) distance.

Another common primary design is multiple merge primaries, where more than one merge collector exists between primary inlet and final collector merge point. For example, in an inline four-cylinder engine having four exhaust inlet primaries, the inlet primaries are cascaded together in pairs via two-inlet, one-outlet collectors. In this example, the two pairs of exhaust inlet primaries first join in two independent merge collectors, each with two inlets and an independent outlet. Then, the two collector outlets are merged together into a third collector, also with two inlets and one final outlet. This design is sometimes referred to as "Tri-Y" design because of the three y-shaped, two-inlet, one-outlet merge collectors.

In addition to these non-functional design criteria, some functional methodologies for designing exhaust systems have been used to improve engine performance. One example is U.S. Pat. No. 5,216,883 (Flugger), which describes a header assembly for internal combustion engines. Flugger discloses a header assembly designed to improve engine horsepower by using an expanding collector to lower the pressure in the exhaust header in order to improve scavenging, the process by which combustion by-products are removed from the combustion chamber. Flugger also discusses other methodologies which attempt to improve engine performance via exhaust header design. These design methodologies mainly focus on either the overall header design or the design of the collector itself.

Another example of an exhaust manifold designed using functional considerations is known as a stepped primary. In this design, the internal cross-sectional area of the primary increases or decreases along its length to the collector point to control the speed of a gas pulse traveling through the primary. The momentum energy from each gas pulse is used to improve the engine's exhaust scavenging process. However, although the length of the primary is an attribute in the determination of the dwell time of the gas pulse within the primary, ultimately the timing of the gas pulse is controlled by varying the cross-sectional area with little or no consideration to the choosing of an exhaust primary length as a basis of improving performance. Moreover, the utilization of primaries having varied cross-sectional area disadvantageously increases the cost of the engine of the primary.

Therefore, there is a need for a method for selecting engine primaries to enhance engine performance.

SUMMARY OF INVENTION

A method for primary length tuning of intake and exhaust manifolds in internal combustion engines is provided. In one embodiment, the method calculates optimal exhaust primary lengths in order to utilize the momentum energy of each exhaust pulse and to maximize wave pulse scavenging of the exhaust.

In one embodiment, a method for tuning an intake/exhaust system of a multiple chamber, non-sequentially fired internal combustion engine having a plurality of combustion chambers and an at least equal number of primaries coupled to at least a first bank, wherein each of the primaries is independently coupled to a different one of the plurality of combustion chambers, the method including the steps of assigning a base length to one of the primaries that is connected to the chamber which has the shortest elapsed time in combustion events between the chamber and a subsequent firing chamber for each bank, and determining primary lengths for the remaining primaries in each bank, where a differential between the primary lengths is directly proportional to the elapsed time in combustion events between the chamber in the bank coupled to the primary and a subsequent firing chamber within the bank.

BRIEF DESCRIPTION OF DRAWINGS

The teachings of the present invention can be readily understood by considering the following detailed description in conjunction with the accompanying drawings, in which.

A more particular description of the invention, briefly summarized above, may be had by reference to the embodiments thereof, which is illustrated in the appended drawings. It is to be noted, however, that the appended drawings illustrate only typical embodiments of this invention and are therefore not to be considered limiting of its scope, for the invention may admit to other equally effective embodiments.

DETAIL DESCRIPTION OF INVENTION

The present invention relates to a method for determining lengths of intake and exhaust primaries in a multiple chamber internal combustion engine. The method may be utilized for determining primary lengths in a variety of internal combustion engines, including but not limited to piston engines, rotary engines, Wankel engines, engines having varied cylinder bank arrangements (i.e., V-type, H-type, W-type, in-line, radial, and the like), and engines having different combustion cycles (i.e., two stroke, four stroke, and the like), among other configurations.

Figure 1:
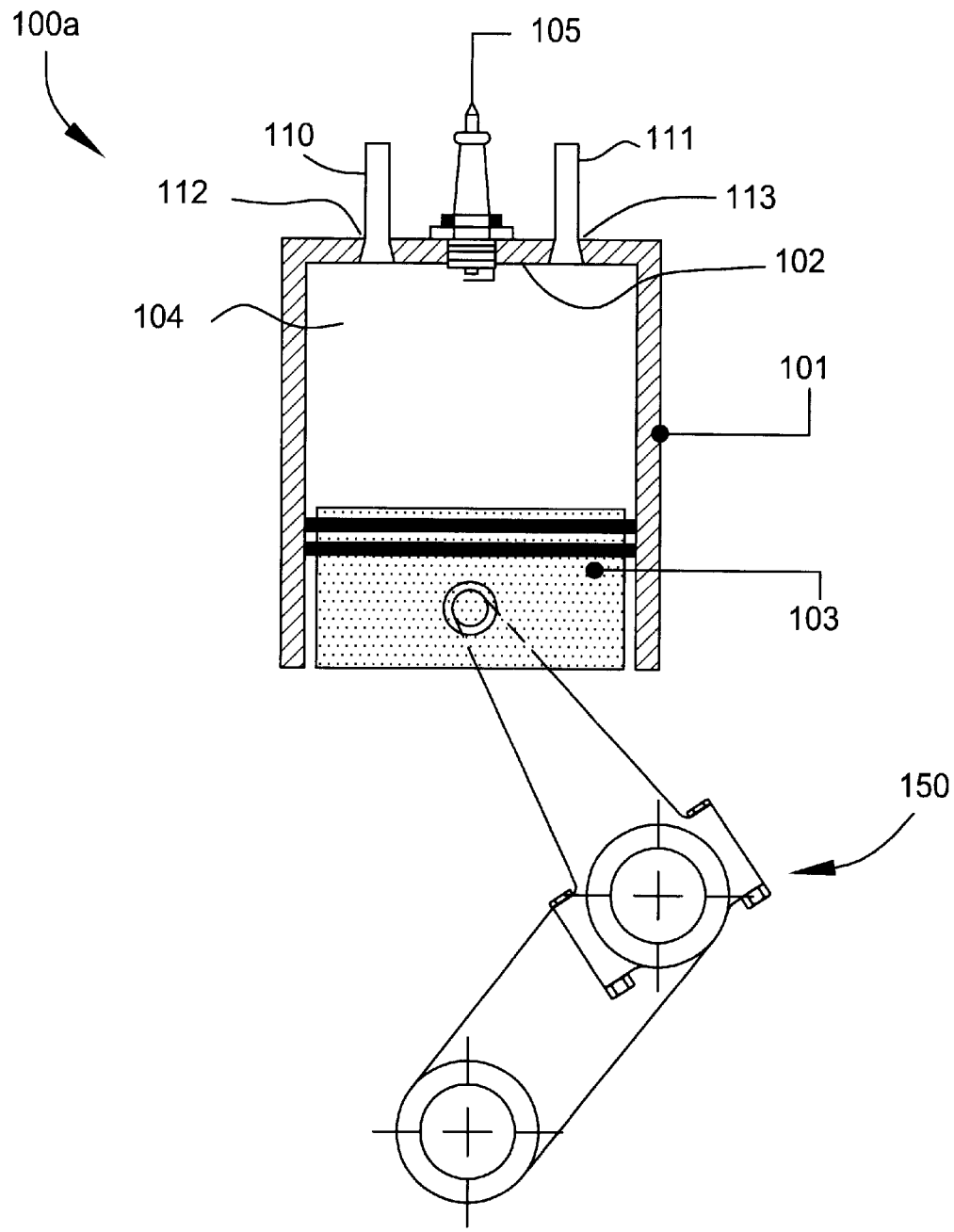
FIG. 1 is a cross-sectional schematic of an illustrative spark-ignition internal combustion piston and cylinder engine.

FIG. 1 depicts a cross-sectional view of an exemplary cylinder assembly 100 of a multi-cylinder spark-ignition internal combustion engine. Cylinder assembly 100 includes a cylinder wall 101, cylinder head 102, and a piston 103 defining a volume 104. A fuel/air inlet 112 is formed through the cylinder assembly 100 for providing air and fuel to the volume 104. The inlet 112 is selectively sealed by an inlet valve 110. An exhaust outlet 113 is formed through the cylinder assembly 100 to allow exhaust of combustion by-products. An exhaust valve 111 selectively seals the outlet 113. A spark plug 105 is typically coupled to cylinder head 102 and is adapted to ignite the air/fuel mixture within the volume 104. Piston 103 is connected to a crank 150. The other cylinders (not shown) are similarly configured.

One type of internal combustion engine uses a four-cycle process and is known as a four-stroke engine. A fuel mixture is injected into volume 104 via inlet valve 110 while piston 103 is moving away from the cylinder head 102 during an intake cycle. The fuel mixture is subsequently compressed in cylinder volume 104 by the motion of piston 103 towards the cylinder head 102 and ignited by a spark generated by spark plug 105 in a compression cycle. The pressure generated by the combustive expansion of the fuel mixture causes piston 103 to move away from cylinder head 102 during a combustion cycle and the combustion byproducts are exhausted to exhaust outlet 113 via exhaust valve 111 during the next upward motion of piston 103 in an exhaust cycle. This four cycle process repeats while the engine is running producing a reciprocating motion of piston 103 within cylinder volume 104. The reciprocating motion of piston 103, in turn, drives crank 150, which transforms the reciprocating motion into a rotational motion (ultimately used, for example, to spin wheels of an automobile or to rotate a propeller of an airplane).

This process sequentially repeats in each cylinder of the multiple cylinder internal combustion engine. Since a force is exerted upon the engine each time the fuel/air mixture combusts, the combustion events are typically spaced over time and location to evenly distribute power pulses and to minimize engine vibration. The distribution of combustion in each cylinder is referred to as the firing order of the cylinders and the amount of time that lapses between firing of any two cylinders is typically measured in crank angle—degrees of rotation of the crank between the two cylinder combustion events. A rotary, or Wankel, engine operates, in relevant part, in a similar manner.

Figure 2:
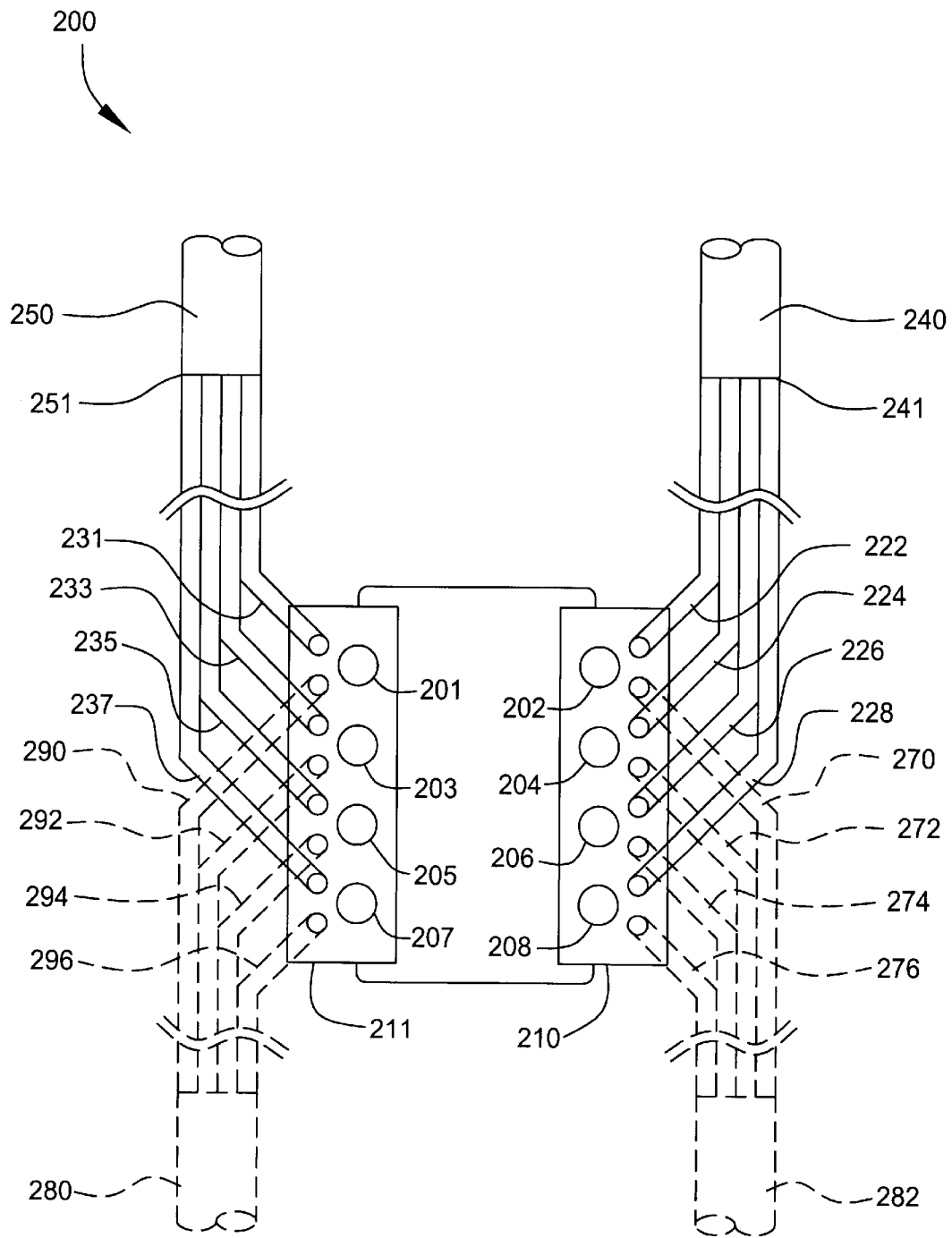
FIG. 2 is an exemplary diagram of an eight-cylinder engine exhaust manifold used to illustrate the method of the subject invention.

FIG. 2 depicts an array of cylinders 201–208 in an exemplary opposed, eight-cylinder engine 200. The exemplary engine 200 is provides for illustration of the inventive method for determine primary lengths. It is understood that the method for determining primary lengths is applicable to other engines and engine configurations as noted above, and diagrams of those engines have been omitted for brevity.

Each cylinder 201–208 is substantially similar to cylinder assembly 100 depicted in cross-section in FIG. 1. The eight-cylinder engine 200 is comprised of two banks 210, 211 of four cylinders each. As described in FIG. 1, each cylinder 201-208 has at least one associated fuel inlet 112 and exhaust outlet 113. Further, engine 200 has an exhaust system which includes exhaust primaries 222, 224, 226, 228 which merge with a collector 240 at a collector merge point 241 on bank 210, and exhaust primaries 231, 233, 235, 237 which merge with a collector 250 at a collector merge point 251 on bank 211.

The engine 200 additionally includes an intake system (shown in phantom) that includes intake primaries 290, 292, 294, 296 that diverge from an intake manifold 280 to a respective intake 112 of each cylinder on bank 211. The intake system also includes intake primaries 270, 272, 274, 276 that diverge from an intake manifold 282 to a respective intake 112 of each cylinder on bank 210.

One embodiment of the method of the present invention determines lengths for each exhaust pirmary 222, 224, 226, 228, 231, 233, 235, 237 in a given engine configuration (i.e., number of cylinders, arrangement, and firing order). Another embodiment of the method of the present invention present invention determines lengths for each inlet primary 290, 292, 294, 296, 270, 272, 274, 276 in a given engine configuration.

Figure 4:
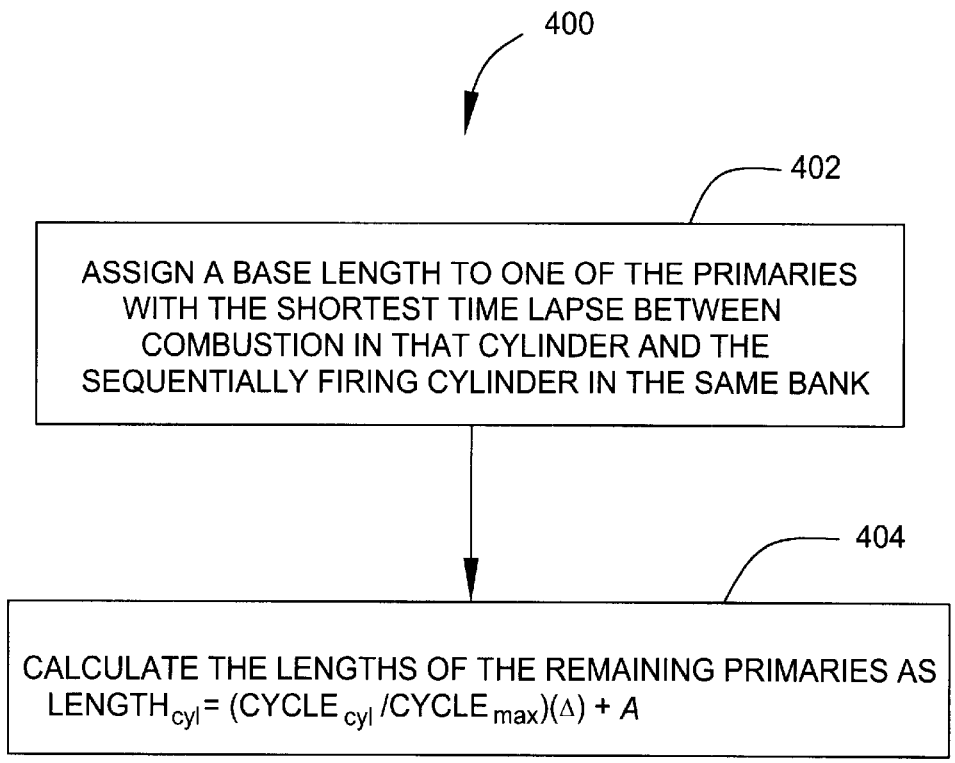
FIG. 4 is a flow diagram depicting the steps of determining the respective primary lengths for an exhaust header using the inventive method described herein.

FIG. 4 is a flow diagram of one embodiment of a primary tuning process 400 in a multi-cylinder engine wherein the cylinders are in a V-bank configuration and the firing sequence is non-sequential. However, the method may also be utilized to determine the primary lengths for various engine configurations, such as in-line, Wankel, radial, and the like. For clarity and ease of explanation, the process 400 will be described as applied to bank 210 as depicted in FIG. 2. To complete the tuning of the engine, the process 400 is repeated for any remaining banks.

At step 402, a base length is assigned to one of the primaries 222, 224, 226, 228. This is accomplished by determining which cylinder 202, 204, 206, 208 has the shortest time lapse between combustion in that cylinder and the sequentially firing cylinder 202, 204, 206, 208 in the same bank 210. The base length is assigned to the primary 222, 224, 226, 228 that is attached to that cylinder. The base length, or length of the shortest primary, may be any length, but is typically between 20 to 40 inches for V-8 automobile engines and is selected by factors discussed above or their equivalent, such as convenience, geometry, desired RPM for best operating efficiency, and the like.

At step 404, the lengths of the remaining primaries 222, 224, 226, 228 can be calculated and assigned to their respective cylinder. This is accomplished by applying a formula provided by the invention that returns the length of a respective primary 222, 224, 226, 228 based upon the base length, differential, maximum time elapsed between any sequentially firing cylinders in a given bank 210, and the firing time elapsed between a given cylinder 202, 204, 206, 208 and the subsequent firing cylinder 202, 204, 206, 208 in the same bank 210.

The relationship between primary lengths depend upon combustion event timing and may be represented by the formula:

$$Length_{cyl} = \frac{cycle_{cyl}}{cycle_{max}}(\Delta) + A$$

Where:
cyl is the cylinder in the bank for which the primary length is being calculated;
$Length_{cyl}$ represents the length of the primary connected to a given cylinder;
$cycle_{cyl}$ represents the time elapsed, in degrees of crank angle, between combustion events in a given cylinder and the subsequent firing cylinder in the same bank;
$cycle_{max}$ represents the maximum time elapsed, in degrees of crank angle, between combustion events in sequentially firing cylinders in a given bank;
$\Delta$ represents the differential between the longest and shortest (base length) primaries. The differential is constrained by the realistic packaging of an exhaust manifold and is typically between one and 10 inches. Although any length may be selected, engines operating at high revolutions per minute (RPMs) benefit most from large differences while engines operating at low RPMs benefit most from small differences. Thus, a differential should be selected to enhance engine performance at its intended operating speed, or RPM; and
A represents the selected base length of the shortest primary.

The result of the application of this method is that the length of the primaries 222, 224, 226, 228 from the exhaust outlet 113 to the collector merge point 241 will be directly proportional to the time elapsed in degrees of crank angle rotation between sequentially firing cylinders on bank 210 of the engine 200. This coordination of exhaust gases forces gas pulses to reach the collector merge point 241 in coordination with the timing of the next combusting cylinder. This is because wave dynamics from an exhaust pulse cause a rarefaction in the remaining primaries 222, 224, 226, 228. When an exhaust pulse is timed to reach the collector merge point 241 when the next combusting cylinder begins to empty into its respective primary 222, 224, 226, 228, the exhaust is more efficiently and effectively scavenged due to the resulting negative pressure in the primaries 222, 224, 226, 228. Additionally, the momentum of the exhaust pulse traveling through collector 240 when the next combusting cylinder begins to empty into its primary 222, 224, 226, 228 will be correctly timed, or phased, to create further negative pressure in collector 240, further enhancing the scavenging process. Although the provided examples and explanations relate to tuning an exhaust system, the inventive method disclosed above is equally applicable for selecting the lengths of intake primaries utilizing the same method.

Figure 3:
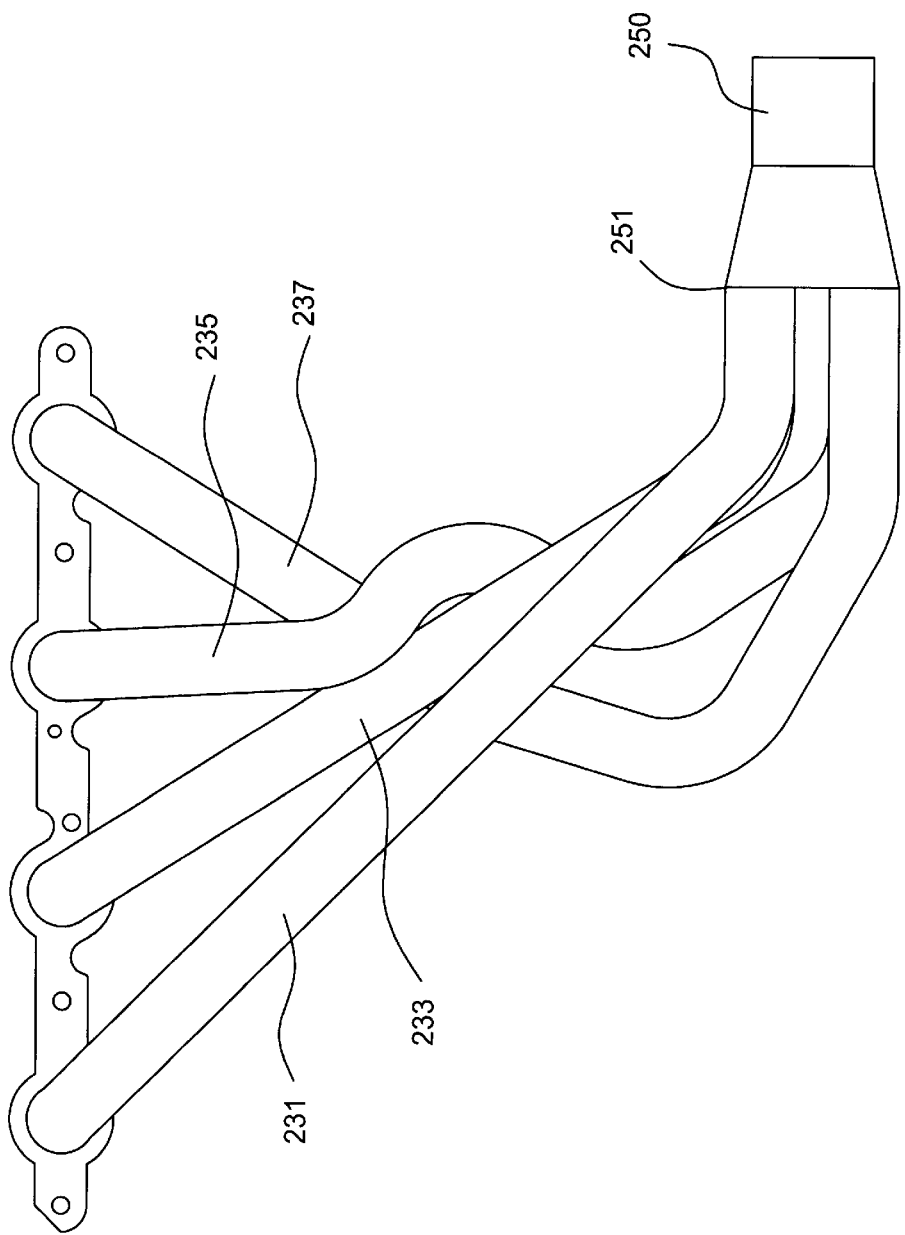
FIG. 3 is a detail of one bank of primaries contained in the exemplary eight-cylinder engine exhaust manifold depicted in FIG. 2.

An example of the application of this method to bank 211 of the eight-cylinder, V-configured engine (V8) depicted in FIG. 2, and in closer detail in FIG. 3, will help in the understanding of the method. A given cylinder 201–208 fires every two rotations of the crank 150 (detailed in FIG. 1), or 720 degrees, and the combustion events in the eight cylinders are equally temporally spaced. Therefore, one cylinder will fire every 90 degrees of rotation of the crank 150. (i.e., subsequent firing cylinders fire after 90 degrees of crank angle have elapsed, and subsequent firing cylinders in a given bank fire after 90 degrees of crank angle have elapsed plus 90 degrees for each intervening cylinder that fires on the opposing bank.)

Suppose the firing order is cylinder 201, 208, 207, 202, 206, 205, 204, 203. Therefore, the firing order of bank 211 is 201, x, 207, x, x, 205, x, 203, where the x indicates a cylinder 208, 202, 204, 206 firing in bank 210. The elapsed time in degrees of crank angle rotation between subsequently firing cylinders in bank 211 would be 180, 270, 180, and 90 degrees respectively for cylinders 201, 207, 205, and 203. Using the convention of the formula, this defines $cycle_{203}$=90 degrees, $cycle_{201}$=$cycle_{205}$=180 degrees, and $cycle_{207}$=$cycle_{max}$=270 degrees.

Starting with step 402 in FIG. 4, a primary base length of 30 inches is assigned as the base length for the cylinder 201, 203, 205, 207 with the shortest elapsed time between combustion events. In this example, since cylinder 201 fires only 90 degrees after cylinder 203 fires, primary 233 will be the shortest primary.

At step 404 the length for the remaining exhaust primary lengths for bank 211 can be calculated using the differential between the base length and the longest primary (in this example five inches), the base length of 30 inches, and the respective cycle times as indicated by the formula. For cylinder 201, the length of primary 231, is calculated to be 33⅓ inches:

$$Length_{201} = \frac{cycle_{201}}{cycle_{max}}(\Delta) + A = \frac{180}{270}(5) + 30 = 33\frac{1}{3}$$

Since cylinder 201 and 205 each have the same elapsed time of 180 degrees of crank angle rotation between subsequent firing events, primary 235 will also have a length of 33⅓ inches.

The length of the remaining primary, primary 207, will have a length of 35 inches, calculated by:

$$Length_{207} = \frac{cycle_{207}}{cycle_{max}}(\Delta) + A = \frac{270}{270}(5) + 30 = 35$$

This methodology would be repeated for bank 210 to determine the relative lengths of primaries 222, 224, 226, and 228, thereby completing the exhaust primary tuning for that particular engine design. Additionally, the method 400 may be utilized to determine intake manifold primary lengths.

Thus, primaries designed using the inventive method allow the wave dynamics from each exhaust pulse to be used to improve the function of the manifold by improving its ability to scavenge exhaust gases. Additionally, momentum energy from each exhaust pulse to be used to improve the function of the exhaust manifold by improving its ability to scavenge exhaust gases. Both the wave dynamics and momentum of exhaust gases are used to improve the engine performance by improving the engine's exhaust scavenging process allowing the exhaust scavenging process to be completed faster, more efficiently, and more harmonically than generic designs. The performance gain resulting from the design's improved exhaust scavenging includes increased volumetric efficiency, which results in increases in brake specific fuel consumption, specific volume output, and engine acceleration capability.

Figure 5:
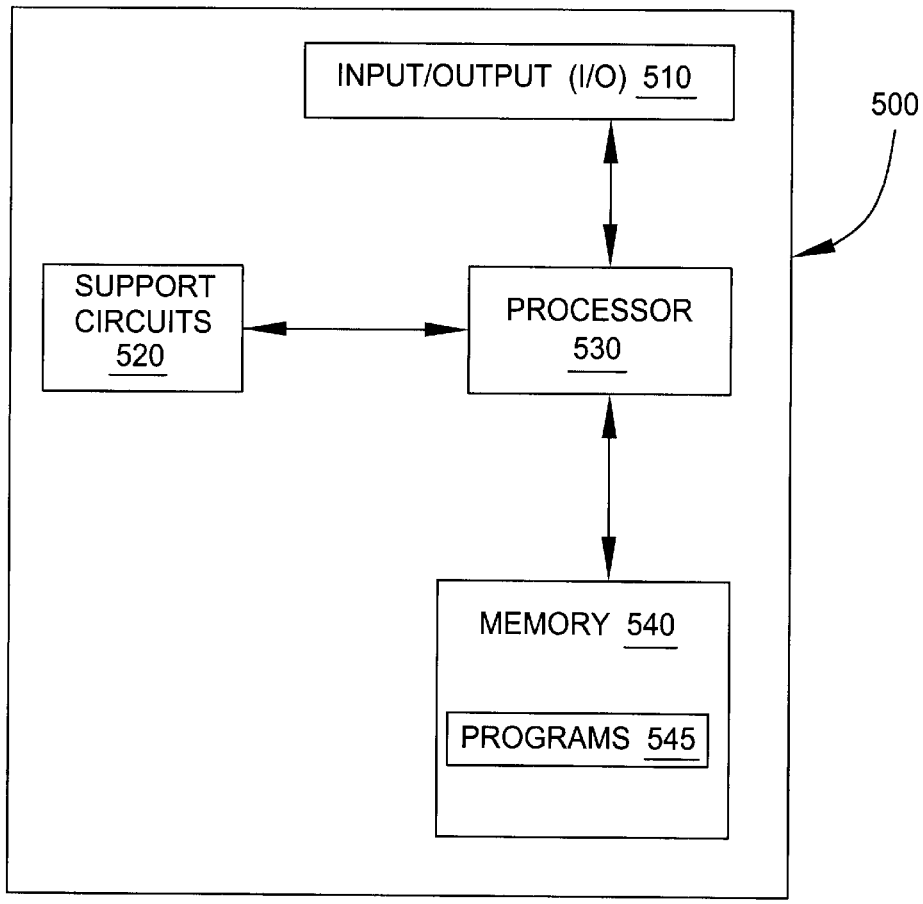
FIG. 5 is an exemplary computing device useful in executing the methods of the invention.

FIG. 5 depicts a high-level block diagram of a computing device for executing the methods of the present invention. Specifically, the computing device 500 of FIG. 5 comprises a processor 530 as well as memory 540 for storing various control programs. The processor 530 cooperates with conventional support circuitry 520 such as power supplies, clock circuits, cache memory, and the like as well as circuits that assist in executing the software routines stored in the memory 540. As such, it is contemplated that some of the process steps discussed herein may be implemented within hardware, for example, as circuitry that cooperates with the processor 530 to perform various steps. The computing device 500 also contains input/output (I/O) circuitry 510 that forms an interface between the various functional elements communicating with the computing device 500.

Although the computing device 500 of FIG. 5 is depicted as a general-purpose computer that is programmed to perform various control functions in accordance with the present invention, the invention can be implemented in hardware as, for example, an application specific integrated circuit (ASIC). As such, the process steps described herein are intended to be broadly interpreted as being equivalently performed by software, hardware, or a combination thereof.

The computing device 500 may be utilized to execute a program 545 that is stored in the memory 540. In one embodiment, the program 545 contains instructions, which when executed, performs a method of determining a length of a engine primary to determine lengths of exhaust and/or intake primaries, for example, the tuning process 400 described above.

While the foregoing is directed to the preferred embodiment of the present invention, other and further embodiments of the invention may be devised without departing from the basic scope thereof, and the scope thereof is determined by the claims that follow.

What is claimed is:

1. A method for tuning an intake/exhaust system of a multiple chamber internal combustion engine, the method comprising:

assigning a base length to a primary which is connected to a chamber which has the shortest elapsed time in combustion events between the chamber and a subsequent firing chamber in a bank;

determining a length for all remaining primaries in the bank, where the differential between the primary lengths is directly proportional to the elapsed time in combustion events between the chamber coupled to the primary and the subsequent firing chamber in the bank.

2. The method of claim 1, wherein the primaries are intake primaries.

3. The method of claim 2, wherein the plurality of chambers is between four and twelve, inclusively.

4. The method of claim 1, wherein the primaries are exhaust pharmacies.

5. The method of claim 4, wherein the plurality of chambers is between four and twelve, inclusively.

6. The method of claim 1, wherein the bank is arranged in a circle.

7. A method for tuning an intake/exhaust system of a multiple chamber internal combustion engine, the method comprising:

assigning a base length to a primary which is connected to a chamber which has the shortest elapsed time in combustion events between the chamber and a subsequent firing chamber in a bank, for each bank; and calculating a length of each remaining primary in the bank, for each bank, wherein the length of each remaining primary in the bank is expressed by:

$$Length_{cyl} = \frac{cycle_{cyl}}{cycle_{max}}(\Delta) + A$$

where:
$Length_{cyl}$ is the length of the primary coupled to a particular cylinder;
cyl indicates the cylinder for which the length is being calculated;
$cycle_{cyl}$, is the time elapsed between combustion events in a given cylinder and the subsequent firing cylinder within the same bank;
$cycle_{max}$ is the maximum time elapsed between combustion events in sequentially firing cylinders within a given bank;
$\Delta$ is the differential between the longest and shortest (base length) primaries; and
A is the base length of the shortest primary.

8. The method of claim 7, wherein the primaries are intake primaries.

9. The method of claim 8, wherein the plurality of cylinders is between four and twelve, inclusively.

10. The method of claim 7, wherein the primaries are exhaust primaries.

11. The method of claim 10, wherein the plurality of cylinders is between four and twelve, inclusively.

12. The method of claim 7, wherein the bank is arranged in a circle.

13. A computer readable medium capable of storing instructions which, when executed, perform a method of determining a length of a engine primary, comprising:

assigning a base length to a primary which is connected to a chamber which has the shortest elapsed time in combustion events between the chamber and a subsequent firing chamber in a bank, for each bank; and calculating a length of each remaining primary in the bank, for each bank, wherein the length of each remaining primary in the bank is expressed by:

$$Length_{cyl} = \frac{cycle_{cyl}}{cycle_{max}}(\Delta) + A$$

where:
$Length_{cyl}$ is the length of the primary coupled to a particular cylinder;
cyl indicates the cylinder for which the length is being calculated;
$cycle_{cyl}$ is the time elapsed between combustion events in a given cylinder and the subsequent firing cylinder within the same bank;
$cycle_{max}$ is the maximum time elapsed between combustion events in sequentially firing cylinders within a given bank;
$\Delta$ is the differential between the longest and shortest (base length) primaries; and
A is the base length of the shortest primary.

* * * * *

UNITED STATES PATENT AND TRADEMARK OFFICE
CERTIFICATE OF CORRECTION

PATENT NO. : 6,564,767 B1
DATED : May 20, 2003
INVENTOR(S) : Brian T. Reese

It is certified that error appears in the above-identified patent and that said Letters Patent is hereby corrected as shown below:

Column 4,
Line 29, please change "pirmary" to -- primary --.

Column 7,
Line 50, please change "pharmacies" to -- primaries --.

Signed and Sealed this

Fifteenth Day of July, 2003

JAMES E. ROGAN
*Director of the United States Patent and Trademark Office*